United States Patent
Brüggendick et al.

[11] Patent Number: 5,289,954
[45] Date of Patent: Mar. 1, 1994

[54] DEVICE FOR METERED REMOVAL OF FLOWABLE SOLID MATERIAL

[75] Inventors: Hermann Brüggendick, Hünxe; Karl Klinginger, Essen, both of Fed. Rep. of Germany

[73] Assignee: STEAG Aktiengesellschaft, Essen, Fed. Rep. of Germany

[21] Appl. No.: 906,219

[22] PCT Filed: Nov. 30, 1990

[86] PCT No.: PCT/EP90/02056
§ 371 Date: Jun. 25, 1992
§ 102(e) Date: Jun. 25, 1992

[87] PCT Pub. No.: WO91/09801
PCT Pub. Date: Jul. 11, 1991

[51] Int. Cl.⁵ .................................. G01F 11/00
[52] U.S. Cl. ................... 222/409; 222/342; 222/485; 222/559; 414/325
[58] Field of Search ........... 222/342, 333, 351, 361, 222/362, 353, 348, 403, 404, 409, 429, 485, 504, 547, 559; 414/325, 587

[56] References Cited
U.S. PATENT DOCUMENTS

| | | | |
|---|---|---|---|
| 2,079,802 | 5/1937 | Hauk | 222/559 |
| 2,620,946 | 12/1952 | Auer | 222/429 |
| 2,642,206 | 6/1953 | Reed | 222/409 |
| 2,740,564 | 4/1956 | Altstaedt | 222/559 |
| 2,787,208 | 4/1957 | Russell | 222/361 |
| 3,207,382 | 9/1965 | Chappius | 222/342 |
| 3,962,998 | 6/1976 | Lynch | 222/485 |
| 4,776,943 | 10/1988 | Tegel | 222/559 |

FOREIGN PATENT DOCUMENTS

| | | |
|---|---|---|
| 1117049 | 4/1959 | Fed. Rep. of Germany . |
| 3244552 | 2/1982 | Fed. Rep. of Germany . |
| 3406413 | 2/1984 | Fed. Rep. of Germany . |
| 2086104 | 12/1971 | France . |
| 1392376 | 4/1988 | U.S.S.R. .......... 222/353 |
| 574421 | 1/1946 | United Kingdom . |

*Primary Examiner*—Andres Kashnikow
*Assistant Examiner*—Philippe Derakshani
*Attorney, Agent, or Firm*—Robert W. Becker & Associates

[57] ABSTRACT

A device for metered removal of flowable solid material comprises at least one delivery opening for the flowable solid material and an essentially horizontal intermediate storage floor for receiving the flowable solid material, arranged below said delivery opening. A collecting space for the flowable solid material is defined between the intermediate storage floor and the delivery opening. A lateral opening is positioned in the intermediate storage floor adjacent to the delivery opening. At least one removal rake with at least one blade is inserted into the collecting space and movable relative to the intermediate storage floor transverse to a delivery direction of the delivery opening for pushing the flowable solid material collected under the delivery opening into the lateral opening. A pivoting parallelogram-shaped rod arrangement with upper pivoting axes that are arranged in a common horizontal plane is provided for pivotably supporting the removal rake.

14 Claims, 2 Drawing Sheets

DEVICE FOR METERED REMOVAL OF FLOWABLE SOLID MATERIAL

BACKGROUND OF THE INVENTION

The invention relates to a device for the metered removal of flowable solid material (fluid bulk material), that is poured onto an essentially horizontal intermediate floor below at least one delivery opening, whereby a removal rake with at least one blade engages the space below the delivery opening and is arranged so as to be movable relative to the intermediate storage floor transverse to the pouring direction such that below the delivery opening the collected fluid bulk material is pushable into a lateral opening.

Adsorption medium reactors with a continuously or quasi-continuously moving bed of a pourable or flowable adsorption medium are increasingly used for flue gas scrubbing. The efficiency of the flue gas scrubbing depends primarily on the uniform exchange of the leaden adsorption medium particles for fresh and reactive particles. Fresh solid material particles are introduced into the reactor from the top to such an extent as the laden fluid bulk material particles, after passing the reactor and reaction with the fluid to be scrubbed, are removed from the delivery openings. The removal via rotating metering devices has been unsuccessful in practice because of the aggressiveness of the removed material as well as the non-uniform particle size and shape of the adsorption medium. With respect to especially large-scale technical adsorption apparatus, simple charging devices, such as flaps, slides, or rakes, of the aforementioned kind are used which with each cyclical movement release a predetermined amount of the fluid bulk material from each delivery opening.

From German patent application 3 406 413 a device of the aforementioned kind is known in which the removal rake is horizontally guided on the rectangular intermediate storage floor sections so that the intermediate storage floor as well as the lower edges of the removal rake are subjected to great wear. Furthermore, the possibility exists that the flowable bulk material to be removed blocks the rake movement. Operational disturbances as well as inaccurate metering due to limited strokes of the rake may occur and a substantial continuous service expenditure is required.

From French patent application 20 86 104 a device for the metered removal through a delivery opening is known in which below the delivery opening a curved intermediate storage plate is arranged. Two circular sector plates are pivotably mounted on the tube that defines the delivery opening and a single blade connected to the plates is pivotable at a distance over the curved intermediate storage plate in order to push the flowable bulk material collected on the intermediate storage plate over its edges. Because of the pivoting mounting with only one pivoting axis it is necessary to provide the intermediate storage plate with a great curvature. For a metered delivery from a plurality of delivery openings arranged in a row one after the other the known arrangement is not suitable.

It is an object of the invention to improve the device of the aforementioned kind such that, while maintaining an essentially horizontal guiding, a reliable metering function over an extended period of operation in a service-free manner is ensured under the aggravated conditions of removal of aggressive, sharp-edged, and granular fluid bulk material.

SUMMARY OF THE INVENTION

This object is inventively solved by pivotably supporting the removal rake having at least one blade a pivoting parallelogram-shaped rod arrangement, whereby all upper pivoting axes are arranged in a common horizontal plane.

The important advantage of the invention lies in the fact that the removal rake disposes of clogging-susceptible linear guides. The pivoting bearings may be arranged remote from the areas that are especially exposed to dust and granular material essentially above the delivery openings and, on the other hand, may be encapsuled such that the introduction of dust or abraded particles is essentially prevented. The horizontal movement of the pivotingly or pendulously supported rake is sufficiently great to transport the cone of fluid bulk material collected under each delivery opening during each movement, back and forth, into the lateral openings on either side. The vertical movements which have a short stroke relative to the horizontal stroke loosen the cone of the fluid bulk material and reduce, in comparison to exclusively horizontal linear movements, the pushing forces required for transporting the fluid bulk material. A grinding contact between the removal rake, respectively, its blades, and the fixed components of the device does not take place or, if at all, takes place indirectly via the solid particles to be removed only to a small extent.

An especially exact horizontal guidance of the removal rake without intermeshing guiding components may be accomplished by suspending the removal rake from a pivoting parallelogram-shaped rod arrangement whereby all pivoting axis are located in a common horizontal plane which is arranged at a distance above the delivery openings. With this kind of a pendulous suspension the blade angles remain constant in each individual movement phase and, accordingly, may be adjusted to an optimal blade efficiency during the forward as well as during the backward stroke.

In the common adsorption apparatus the delivery openings are arranged in a grid- or matrix-like arrangement in rows and columns. The removal rake may be coordinated with a plurality of delivery openings arranged in a plane or at least in one row one after the other. This reduces the expenditure for one or more coordinated drive units.

Preferably, a plurality of rectangular intermediate floor sections and delivery openings are arranged one after the other in the direction of movement of the rake. After the blade has passed the space below each delivery opening, the fluid bulk material is collected again and is removed during the backward movement into the lateral opening on the other side of the intermediate storage floor section.

In a preferred embodiment the removal rake is comprised of a frame into which walls that act as the blades are inserted.

The drive of the removal rake, in a preferred embodiment of the invention, is derived from at least one crank gear. The crank gear provides for the exact adjustment of a horizontal movement stroke without being influenced by superimposed slight vertical movements. A plurality of removal rakes may be actuatable in different movement cycles and/or actuatable such as to be displaced in phase. Accordingly, a plurality of adjacent reaction chambers or chamber sections with different bed movement velocities or different exchange amounts may be serviced in order to optimally adjust the removal of the fluid bulk material to the reaction conditions within all reactor areas.

The support components and their fixation means may be adapted to the individual applications. For example, the removal rake may be suspended at the reactor bottom or from a separate support structure.

BRIEF DESCRIPTION OF THE DRAWINGS

Further details of the invention will become apparent from the following description of the schematically represented embodiments shown in the drawings. Partial combinations of the features of the claims are also considered to be inventively disclosed.

The drawings it show in.

DESCRIPTION OF PREFERRED EMBODIMENTS

Figure 1:
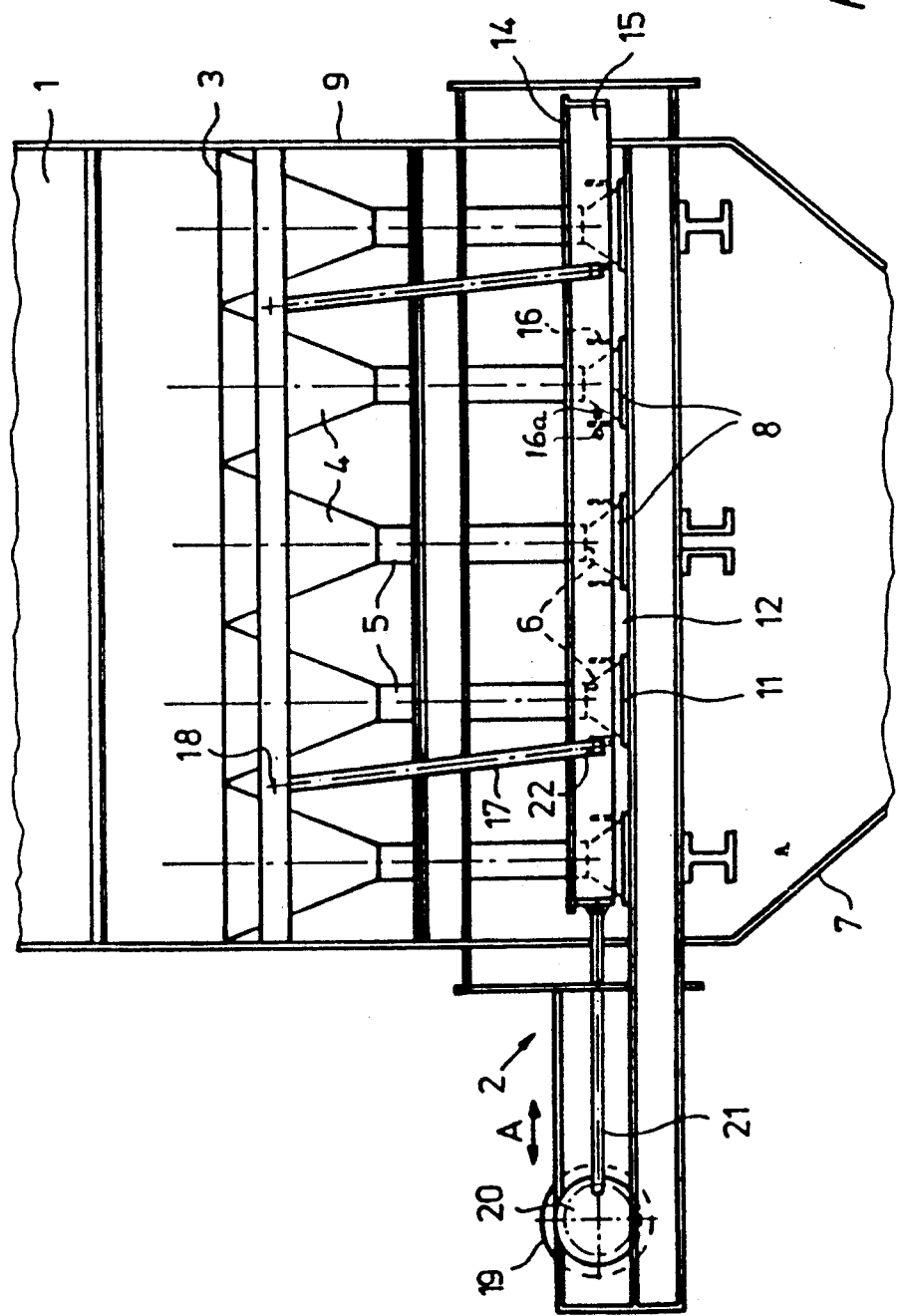
FIG. 1 a vertical view of the lower portion of an adsorption apparatus with an embodiment of the novel removal device, viewed transverse to the direction of movement of the moving parts of the removal device.
Figure 2:
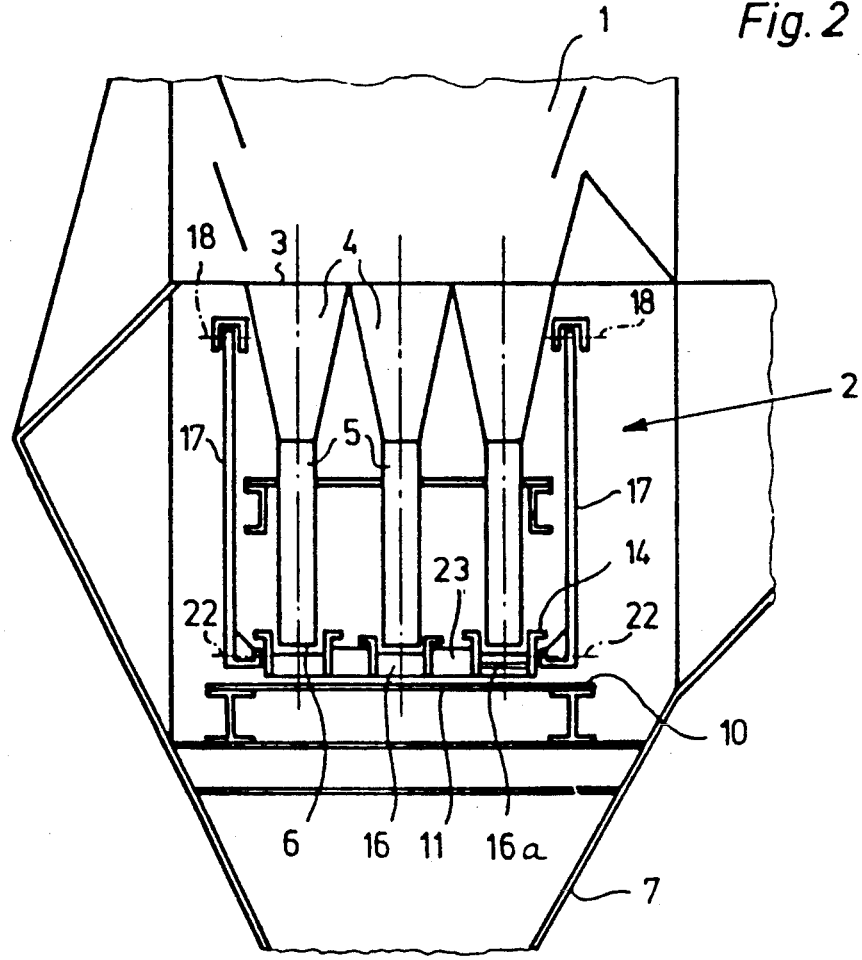
FIG. 2 is a vertical view taken at a right angle to FIG. 1.

In the representation according to FIGS. 1 and 2, the invention is shown in its application for a so-called transverse flow absorber in which the fluid to be scrubbed flows through the reactor 1 from the left to the right in FIG. 1, while the adsorption medium passes through the reactor in a vertical direction according to the removal efficiency of the removal device 2 arranged at the bottom of the reactor.

Fifteen removal funnels 4 are arranged in a matrix of five columns and three rows within the reactor bottom 3. Each removal funnel 4 opens into a vertically extending removal channel 5. All removal channels have delivery openings 6 arranged in a common horizontal plane.

At a distance below each delivery opening an intermediate storage floor 10 is arranged which has a plurality of rectangular sections 11 arranged in a common horizontal plane. At both sides of each section 11 of the intermediate storage floor 10 lateral openings 12 are provided which open into a common removal funnel 7 which extends over the entire area of the reactor bottom. The above described components of the adsorption apparatus are known. Their embodiment is noncritical for the invention, in other words, the subsequently described removal device with principally identical advantages in counterflow, transverse flow, and even in uniflow reactors as well as in all apparatus in which flowable solid materials are metered and removed from a reaction chamber or other storage chamber.

Figure 3:
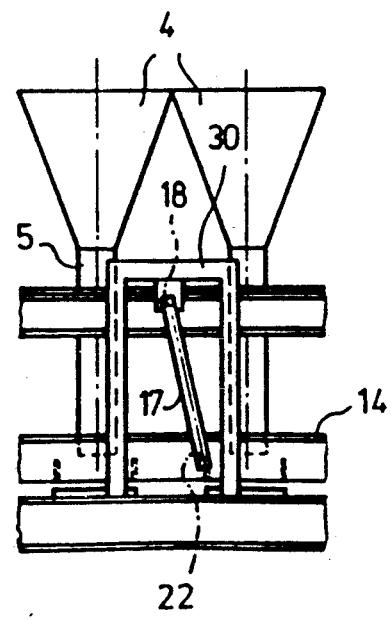
FIG. 3 is a detailed view in which an alternative suspension of the removal rake of FIG. 1 is shown.

In FIG. 1 cones 8 of the fluid bulk material are represented below the delivery openings 6 which during operation collect above each section 11 of the intermediate storage floor 10 before they are removed. The removal device 2 is comprised of a removal rake 14 which is comprised of a rectangular frame 15 and blades 16 arranged in a ladder-type arrangement. The rake is dimensioned such that it, with the blades 16 and the transversely extending frame sides, may be moved without contact in the space between the intermediate storage floor 10 and the lower edges of the removal channels 5 which form the delivery openings 6. The cones 8 may be delimited by the blades 16 and the transversely extending sides of the frame 15. The rake 14 is suspended from pivot arms 17 forming a pivoting parallelogram such that its frame 15 in any pivoting position of the pivoting parallelogram is horizontal. The pivot arms 17 at their upper end have fixedly arranged bearing points the axes 18 of which are parallel to one another and in a common horizontal plane. In the embodiment of FIGS. 1 and 2 the bearing points are arranged adjacent to the reactor bottom 3 at reactor support constructions 9. Alternatively, the pivot arms 17 may also be arranged at its own support bridges 30 (FIG. 3).

A motor 19 in combination with a crank gear 20 serves as a drive for the removal device 2. The crank gear 20 has a connecting rod 21 which is connected with one end to the removal rake 14 and drives the removal rake 14 in the direction of the double-headed arrow A in FIG. 1. The movement in the horizontal main direction A is superimposed by a slight vertical movement due to the pendulous suspension of the rake 14, which however in comparison to the horizontal transport movement in the direction of arrow A is minute. It is becoming smaller when the distance between the connecting points 18 and 22 of the pivot arms 17 becomes greater. The slight vertical movement is, however, desirable during operation because via the blades 16 of the removal rake 14 it provides an additional rotational or rolling movement to the granular or powdery material when passing the sections 11 and thereby breaks up clumps that have formed. A increased breaking of the clumping fluid bulk material may be achieved via rods, prongs, edge-shaped projections, ribs, protrusions etc. 16a which are arranged at the effective blade faces of the removal rake 14 at the leading face and which break up the fluid bulk material in the manner of a rake or a plow. The stroke and direction of the double arrow A is selected to be great enough that each cone is moved into one neighboring lateral opening 12 at least during a stroke in one direction. Preferably, the arrangement of the blades 16 and the transversely extending sides of the frame 15 is such that in each direction of movement a transport of the cone 8 into one of the two neighboring lateral openings 12 and removal via the removal funnel 7 takes place.

As indicated above, for the kinematics and the removal efficiency of the removal device represented in FIGS. 1 and 2 it is not important at which horizontal positions the bearing points 18 are arranged. Important are the horizontal pivoting stroke and the arrangement, respectively, the grid of the blades 16 and/or of the frame sides. This grid, in the embodiment corresponding to FIG. 1, is selected such that in the right end position (FIG. 1) of the rake 14 the outermost right blade 16 has pushed the cone 8 below the first removal channel into the outermost right lateral opening 12. In the opposite outermost left position of the rake 14, respectively, of the pivot arms 17, the same blade 16 has pushed and removed the cone that has formed in the meantime under the outermost right deliver opening 6 above the right section 11 into the area of the left lateral opening 12. The blade 16 thus has its deepest vertical position in the pivoting position of the rake 14 in which it is arranged axially below the delivery openings 6. The blades 16 and the transversely extending sides of the frame 15 (FIG. 1 left and right) may also serve to delimit and adjust the cones 8. For this purpose, the distance between neighboring blades 16 must be smaller than the width of each intermediate storage floor section 11 in the direction A. Furthermore, the rake, after each removal stroke must be stopped in a suitable position in which the blades are centered in pairs relative to the axes of the delivery openings 6 so that respectively centered cones 8 will result.

The entire matrix of removal channels 5 and delivery openings 6 arranged in rows and columns is serviced in the described embodiment by a rectangular removal rake 14. The ladder-like inserted blades 16 are rigidly connected by transverse members 23 between rows, that is in the direction of the columns. The transverse members 23 may also be omitted and the thus resulting rakes 14 which serve individual rows may be driven at different velocities and/or such that they are displaced in phase. For this purpose a crank arrangement is also suitable whereby the connecting rods may be connected with different distances and/or with different angular displacements at a common crank disk.

The aforedescribed pivoting suspension of the removal rake 14 is practically universally applicable. The delivery openings 6 must not be arranged on a common horizontal level indicated in the embodiment of the drawing; each blade 16 which is effective between delivery opening 6 and section 11 of the intermediate storage floor may be, corresponding to the position, size and shape of the respective cone, moved on a different movement level and also at different angles of pitch between blades. Furthermore, there are no limitations with respect to the number and/or position of the delivery openings 6 and the intermediate storage floor sections 11 serviced by one removal rake. Parameters of this kind may be freely selected with the invention by the person constructing the apparatus. By suitably selecting the length of the pivot arms 17, the ratio between the horizontal and the vertical stroke may be adjusted also. As can be seen, for fixing and guiding the movable parts of the inventive removal device only simply pivoting bearings 18, 22 are necessary which are indifferent with respect to dust and granular loads at the place of operation.

The present invention is, of course, in no way restricted to the specific disclosure of the specification and drawings, but also encompasses any modifications within the scope of the appended claims.

What we claim is:

1. A device for metered removal of flowable solid material, said device comprising:
    at least one delivery opening for the flowable solid material;
    an essentially horizontal intermediate storage floor for receiving the flowable solid material, said intermediate storage floor arranged below said delivery opening;
    a collecting space for the flowable solid material defined between said intermediate storage floor and said delivery opening;
    a lateral opening in said intermediate storage floor adjacent to said delivery opening;
    at least one removal rake with at least one blade, said removal rake inserted into said collecting space and movable relative to said intermediate storage floor transverse to a delivery direction of said delivery opening for pushing the flowable solid material collected under said delivery opening into said lateral opening; and
    a pivoting parallelogram-shaped rod arrangement having upper pivoting axes that are arranged in a common horizontal plane, with said removal rake being pivotably connected to said parallelogram-shaped rod arrangement.

2. A device according to claim 1, wherein a plurality of said delivery openings is arranged in a common plane and at least in a row one after another and said removal rake is coordinated with said delivery openings.

3. A device according to claim 1, wherein said intermediate storage floor is comprised of rectangular sections and a plurality of said lateral openings, said rectangular sections and said lateral openings arranged alternatingly in a direction of movement of said removal rake.

4. A device according to claim 1, wherein said removal rake is comprised of a frame and wherein said blades are inserted into said frame in a ladder-type arrangement.

5. A device according to claim 1, further comprising a crank gear for driving said removal rake.

6. A device according to claim 1, comprising a plurality of said removal rakes and a plurality of said delivery openings, arranged in a plurality of parallel delivery opening rows, said removal rakes arranged and movable in parallel for servicing said parallel delivery opening rows.

7. A device according to claim 6, wherein said removal rakes are actuatable in different moving cycles.

8. A device according to claim 6, wherein said removal rakes are actuatable such as to be displaced in phase.

9. A device according to claim 6, wherein said removal rakes are actuatable in different moving cycles and actuatable such as to be displaced in phase.

10. A device according to claim 1, wherein said removal rake is connected to a reactor bottom.

11. A device according to claim 1, wherein said removal rake comprises a support structure for supporting said removal rake.

12. A device according to claim 11, wherein said support structure is comprised of at least two parallel bridge supports.

13. A device according to claim 1, wherein said removal rake has means for breaking apart cone structures of the flowable solid material collected on said intermediate storage floor.

14. A device according to claim 13, wherein said means for breaking apart cone structures are selected from the group consisting of cutting edges, rods, prongs, spikes, or projections, said means connected to said blade at its forward face in a direction of pushing.

* * * * *

UNITED STATES PATENT AND TRADEMARK OFFICE
CERTIFICATE OF CORRECTION

PATENT NO. : 5,289,954
DATED : March 1, 1994
INVENTOR(S) : Bruggendick, et. al.

It is certified that error appears in the above-indentified patent and that said Letters Patent is hereby corrected as shown below:

Title page, item [30], under Foreign Application Priority Data insert--
Jan. 5, 1990 [DE] Fed. Rep. of Germany... 4000204.

Signed and Sealed this

Ninth Day of August, 1994

Attest:

BRUCE LEHMAN

Attesting Officer

Commissioner of Patents and Trademarks